Figure 1:
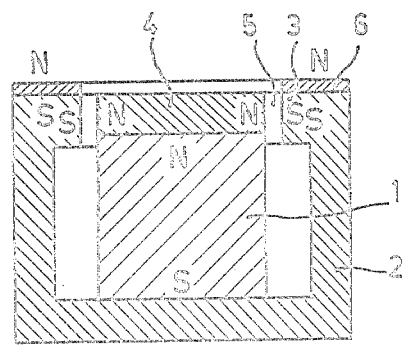

United States Patent

[11] 3,549,830

| [72] | Inventor | Wijtze Hofman<br>Emmasingel, Eindhoven, Netherlands |
|---|---|---|
| [21] | Appl. No. | 696,052 |
| [22] | Filed | Jan. 5, 1968 |
| [45] | Patented | Dec. 22, 1970 |
| [32] | Priority | Jan. 7, 1967 |
| [33] | | Netherlands |
| [31] | | No. 6700283 |

[54] MAGNET CONFIGURATION FOR A LOUDSPEAKER
5 Claims, 2 Drawing Figs.

[52] U.S. Cl. ........................................ 179/117, 335/231
[51] Int. Cl. ........................................ H01f 7/02, H04r 9/02
[50] Field of Search........................................ 179/117, 115.5; 335/231

[56] References Cited
UNITED STATES PATENTS
| 2,864,155 | 12/1958 | Willson | 335/231X |
| 3,106,670 | 10/1963 | Laux | 335/231X |

Primary Examiner—Kathleen H. Claffy
Assistant Examiner—Thomas L. Kundert
Attorney—Frank R. Trifari ABSTRACT: A magnetic system for use with microphones and loudspeakers. A cylindrical magnetic core is centrally located in a hollow cylindrical pot. An airgap exists between one end of the core and the rim of the pot. A permanent magnet overlies the rim of the pot and serves to counteract the stray magnetic field adjacent the airgap.

INVENTOR.
WIJTZE HOFMAN

MAGNET CONFIGURATION FOR A LOUDSPEAKER

The invention relates to a magnetic system, especially for use in loudspeakers and microphones, comprising a central core substantially in the form of a permanent magnetic part which is axially magnetized and is arranged in a pot made of a ferromagnetic material and comprising a bottom plate and a projecting wall. The upper rim of the projecting wall and the central core are in spaced relationship thereby defining an active airgap therebetween.

Such a magnetic system is generally used in the manufacture of loudspeakers.

In such loudspeakers maximum efficiency is obtained if the entire magnetic flux passes through the active airgap. However, this is unattainable owing to the occurrence of leakage. This leakage may occur both in the form of external leakage outside the magnetic system and of internal leakage between the core and the pot. It is well known to reduce the internal leakage or stray field by providing a counteracting magnetic field by means of an additional compensation magnet. The external stray field is considerably reduced by making the pot from a high permeability material. However, a small external stray field still occurs in front of the active airgap.

It is an object of the invention to substantially eliminate the external or residual stray field adjacent the airgap of a small magnetic system through the use of a counteracting magnet.

A further object of the invention is to cause the field lines of a stray magnetic field adjacent the effective airgap of a small magnetic system to travel a relatively long distance in completing the magnetic circuit thereby dissipating the strength of the field due to the reluctance of the path that the field travels.

According to the invention, a magnetic system is provided which includes a magnetic core which is centrally located in a pot of ferromagnetic material. A magnet of similar magnetic polarity to the core is combined with the pot to create a magnetic field which counteracts the stray magnetic field emanating from the core. Particularly, an axially magnetized cylindrical core is concentrically located within a ferromagnetic hollow cylindrical pot having an opening at one end. A soft-iron pole plate on one end of the core is aligned with the rim of the pot. An annular airgap separates the rim from the pole plate. A thin ring-shaped permanent magnet having the same polarity as the pole plate on the core entirely covers the radially extending surface of the rim. The ring-shaped permanent magnet is magnetized simultaneously with the remainder of the magnet system and is magnetized in the same direction as the core. As a result a field is produced outside the effective airgap between the pole plate and the rim which substantially counteracts the stray field which occurs without the use of the ring-shaped magnet.

An embodiment of a magnetic system in accordance with the invention is to provide a permanent magnetic ring which has a thickness which is at least one-fourth times the width of the ring if the ring material has a coercive force $H_c$ of at least 600 oersted and is at least one-seventh times the width of the ring if the magnetic ring material has a coercive force $H_0$ of at least 3,000 oersted.

Figure 2:
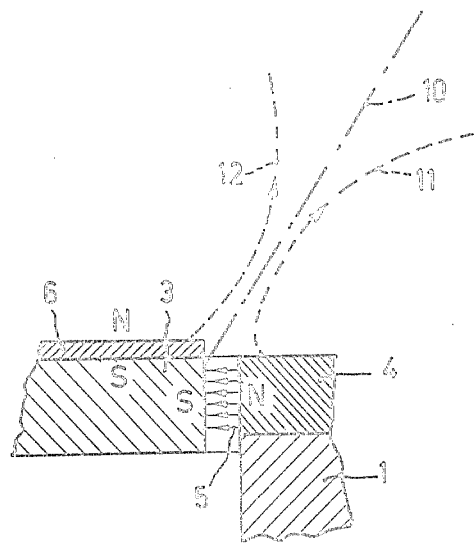

In order that the invention may readily be understood, an embodiment thereof will now be described, by way of example, with reference to the accompanying drawing, in which:

FIG. 1 is a cross-sectional view of a magnetic system for a loudspeaker in accordance with the invention, and FIG. 2 is a cross-sectional view in greater detail of part of the airgap of this system.

The magnetic system shown in FIG. 1 comprises a centrally arranged magnetic core 1 of circular cross section which is made of the material Ticonal 750. At its lower end this magnet is secured to the bottom of a pot 2 made of sintered iron. This pot has an inwardly projecting rim 3 which acts as a pole piece. A soft-iron pole plate 4 is arranged on the other end of the magnetic core 1 which is in the same radial plane as the rim 3. Between the rim 3 and the plate 4 an airgap is left which serves to accommodate a loudspeaker coil (not shown). The core 1 is magnetized axially. The magnetic poles are indicated by N and S.

The upper surface of the pot 2 is covered by a permanent-magnetic thin ring 6 made of ferroxdure.

In FIG. 2, the path of the field in the airgap 5 is shown in greater detail by the arrows.

In the absence of ring 6 an external stray field will be produced. By the provision of the ring 6 which is magnetized in the same direction as the core 1, most of the lines of force of the external stray field are forced back into the airgap. The remaining lines of force, a portion of which are designated by reference characters 11 and 12, are compelled by the positionally opposed and magnetically like poles to travel a long distance through the air in the direction generally indicated by the neutral line 10.

When the ring 6 of thickness 1 mm. was made of ferroxdure having a coercive force $H_c$ greater than 3,000 oersted, the useful flux in the effective airgap was increased by 2 percent.

The dimensions and materials of a preferred embodiment of the magnetic system are:

Outer diameter of core=20 mm.
Length of core=16 mm.
Material of core=Ticonal 750.
Material of pot=sintered iron.
Outer diameter of pot=38 mm.
Wall thickness of pot=4 mm.
Outer diameter of plate=20 mm.
Thickness of plate=4 mm.

The above-cited embodiments are intended as exemplary only, and while I have described my invention with a specific application and embodiment thereof, other modifications will be apparent to those skilled in the art without departing from the spirit and scope of the invention as defined by the appended claims.

I claim:

1. A magnetic field structure for an electroacoustical transducer, comprising a hollow cylindrical ferromagnetic pot open at one end and having a rim portion forming a pole piece surrounding the open end, a magnetic core member concentrically located within the pot and spaced from the rim portion to define a radial airgap between the core and the rim, said core member adjacent the airgap having a given magnetic polarity, and a ring-shaped permanent magnet having its central axis extending in the direction of the axis of said core member and having one end surface in juxtaposition with the rim, said ring-shaped magnet being magnetized in the direction of the central axis thereof with the other end surface thereof at the same magnetic polarity as the core member adjacent the airgap, said free end surface being located in the immediate vicinity of said airgap whereby the magnetically like adjacent poles of said core and said free end surface reduce the stray magnetic field of said airgap by forcing the external stray field back into the airgap and by dissipating the strength of the escaping stray field by directing the lines of force through an increased distance to complete its magnetic circuit.

2. A magnetic field structure as claimed in claim 1 wherein the rim portion extends radially inwardly toward the cylindrical axis and has a depth parallel to said axis along which one dimension of the airgap is measured.

3. A magnetic field structure as claimed in claim 2 further including a pole plate affixed to the magnetic core member adjacent the airgap having the same polarity as the ring-shaped permanent magnet, and positioned so that the surface of the pole plate and rim lie in the same plane.

4. A magnetic field structure as claimed in claim 3 wherein the width of the ring-shaped permanent magnet is 4 times the thickness and the said ring-shaped magnet has an intensity of at least 1,600 oersted.

5. A magnetic field structure as claimed in claim 3 wherein the width of the ring-shaped permanent magnet is 7 times the thickness and the said ring-shaped magnet has an intensity of at least 3,000 oersted.